(No Model.)  2 Sheets—Sheet 1.

G. SWEET.
MOWING MACHINE.

No. 247,707. Patented Sept. 27, 1881.

WITNESSES
Wm A. Skinkle
Geo W Speck

By his Attorneys
Baldwin, Hopkins & Peyton

INVENTOR
George Sweet.

(No Model.) 2 Sheets—Sheet 2.
G. SWEET.
MOWING MACHINE.
No. 247,707. Patented Sept. 27, 1881.
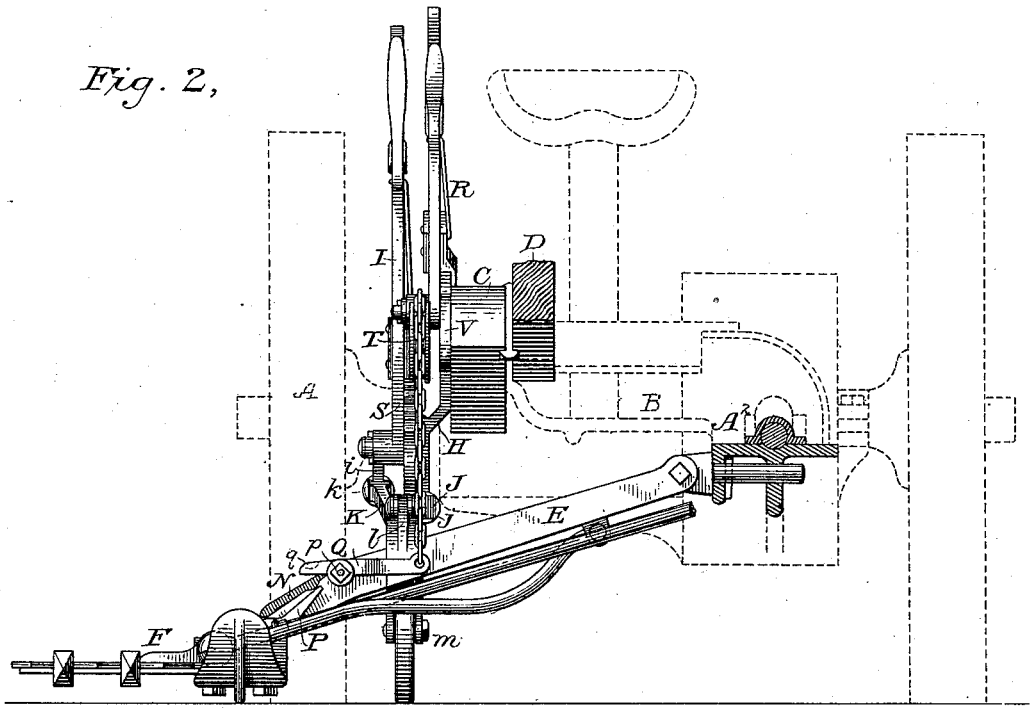
Fig. 2,
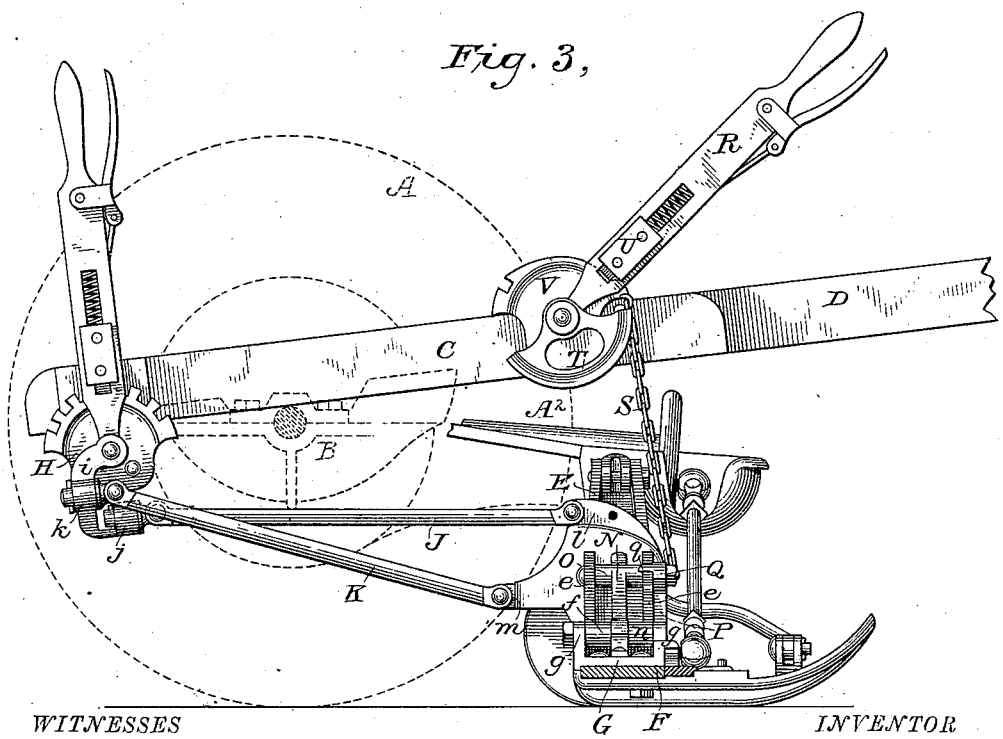
Fig. 3,
WITNESSES
Wm A. Skinkle
Geo. W. Breck.
By his Attorneys
Baldwin, Hopkins & Peyton.
INVENTOR
George Sweet,

UNITED STATES PATENT OFFICE.

GEORGE SWEET, OF DANSVILLE, NEW YORK.

MOWING-MACHINE.

SPECIFICATION forming part of Letters Patent No. 247,707, dated September 27, 1881.

Application filed July 23, 1881. (No model.)

*To all whom it may concern:*

Be it known that I, GEORGE SWEET, of Dansville, in the county of Livingston and State of New York, have invented certain new and useful Improvements in Mowing-Machines, of which the following is a specification.

My invention relates to improvements in devices for controlling the adjustments of and supporting in their elevated positions the finger-beam or cutting apparatus of mowers of the well-known class in which the finger-beams, when in operation, are left free to rise or fall to the desired extent throughout their length, or at their inner or outer ends, respectively, to conform to the inequalities of the surface over which they pass; and my object, mainly, is to provide a simple, efficient, and economical organization of devices whereby the finger-beam may be raised and lowered by its controlling-lever and locked in its turned-up or extreme elevated position, as will hereinafter fully be explained preparatory to specific designation of the subject-matter claimed.

Figure 1:
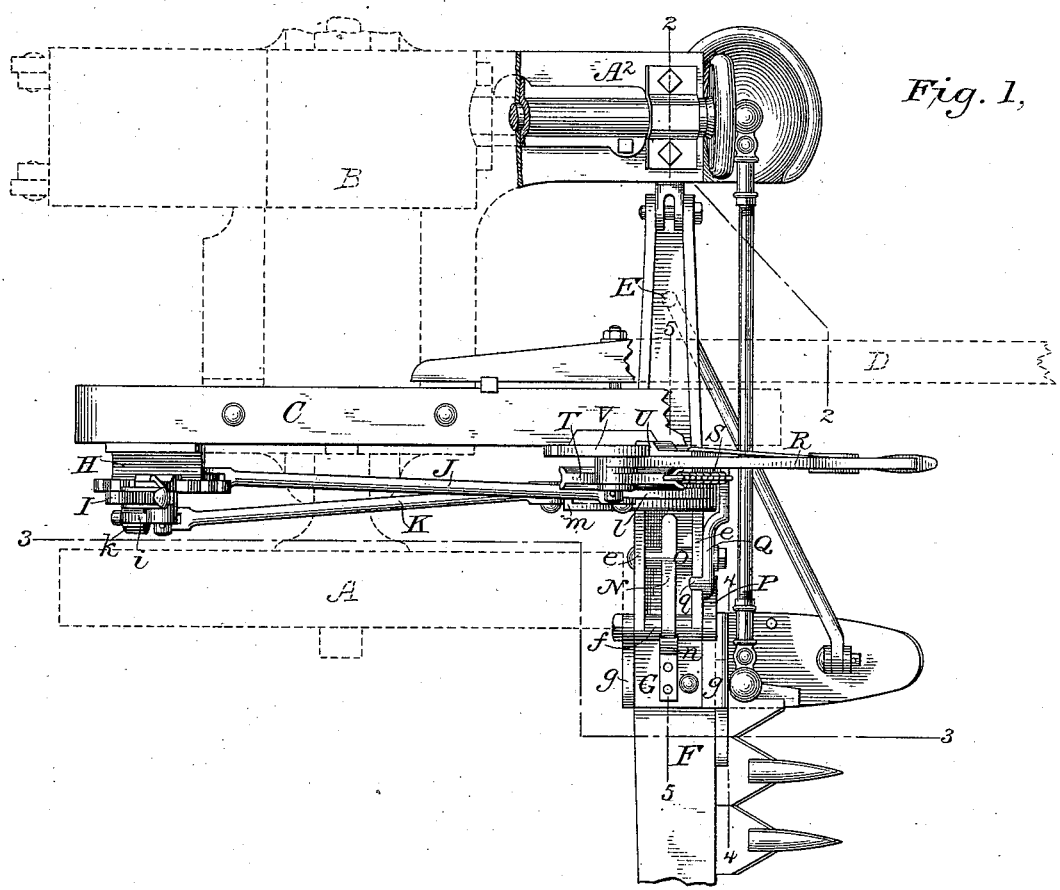
Figure 4:
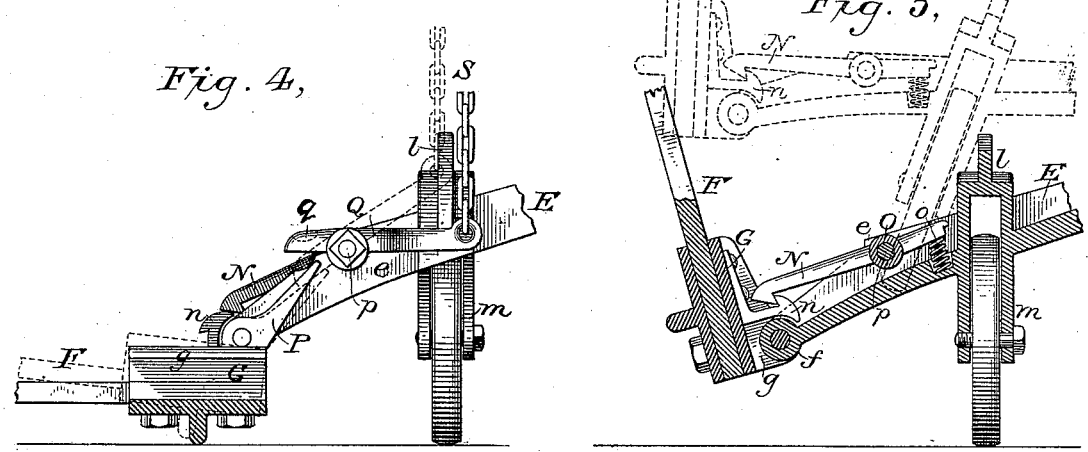
Figure 5:
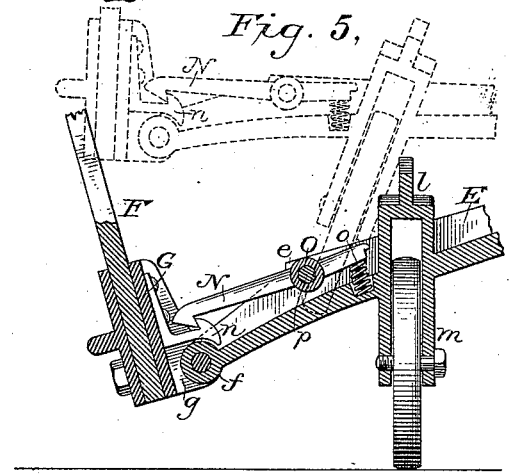

The accompanying drawings show so much of a mower as is deemed necessary to illustrate my improvements as applied to a front-cut machine, such in general features of construction as shown in United States Letters Patent granted to me July 26, 1881, No. 244,947.
Figure 1 is a plan or top view, portions of the machine being indicated by dotted lines and parts broken away. Fig. 2 is a front elevation, partly in section, on the line 2 2 of Fig. 1, parts being shown by dotted lines and other parts broken away. Fig. 3 is a side elevation, partly in section, on the line 3 3 of Fig. 1, with portions of the machine omitted and parts shown by dotted lines. Figs. 4 and 5 are detail views, partly in front elevation and partly in section on the lines 4 4 and 5 5, respectively, of Fig. 1.

Driving-wheels A A, a main frame, B, the main-frame arm or corner-extension A², the wooden frame-bar C, a tongue, D, and the coupling-arm E, doubly jointed to the main-frame arm, are all similar to or substantially the same as the corresponding parts shown in my before-referred-to patent. The vertically-vibrating and axially-rocking coupling-arm E is also provided, as in my aforesaid patent, with a rigid forked bracket or two firmly-attached bearings or flanges, $l\,m$, the one above and the other below the coupling-arm, and the brace-arm J is pivoted to one of these bearings, and the connecting-rod K is jointed to the other.

Instead of singly pivoting or merely pin-jointing the brace-arm J and connecting-rod K to the supporting-bracket H and rocking lever I, respectively, as shown in my before-mentioned patent, two-way flexing or doubly-jointed connections are provided to avoid unnecessary strain or injurious cramping of the parts. As shown by the drawings, (see Figs. 1, 2, and 3,) the brace-arm K at its rear end is pivoted to a swivel-bolt, $j$, turning in a bearing at the bottom of the bracket H, while the rear end of the connecting-rod K is similarly jointed to a swivel-bolt, $k$, turning in a socket provided in the lower projecting end, $i$, of the lever I.

The operation of the devices so far described or referred to will be understood by reference to my patent of July 26, 1881.

The finger-beam F of the cutting apparatus is jointed to the coupling-arm in suitable way, as by a lugged heel-plate or clip-iron, G, and a pin or pivot passing through the clip-lugs $g$ $g$ and through the sleeve bearing or socket $f$, formed with or secured to the end of the coupling-arm.

A shouldered arm or hook, $n$, at the heel of the finger-beam is shown as secured firmly by its flange or base upon the upper surface of the clip-iron G and close to the socket $f$ of the coupling-arm. The top of this hook is slightly rounded or doubly inclined, and its side next the coupling-arm is curved, that it may rest close to the bearing-sleeve $f$.

A vibrating and yielding catch or pivoted and spring-actuated hook, N, co-operates with the fixed hook $n$ and interlocks with it to support the finger-beam when turned up. (See Fig. 5.) This rocking hook is pivoted to the coupling-arm E by a pin or screw-bolt passing through the side ribs or vertical flanges $e\,e$ of the coupling-arm and through the sleeve bearing or socket O of the arm or shank of the rocking hook. Were the coupling arm not flanged, mere lugs might be provided upon it to which to pivot the rocking hook.

A spring, $o$, bears upward against a heel end or extension of the rocking-hook shank, so as to keep this hook against the fixed hook, or against the coupling-arm socket f should the hook n be moved away from the rocking hook by the movements of the finger-beam. When the rocking hook bears upon the socket f, instead of upon the rounded top of the fixed hook, it is held in position to be readily engaged with the fixed hook, which slides under it when the finger-beam is elevated at its outer end. To disengage the two hooks to allow the finger-beam to be lowered from the position in which it is represented in Fig. 5, the heel end of the rocking hook is pressed upon to overcome the force of the spring.

A rigid toe or tappet-like arm, P, is provided at the heel of the finger-beam, being, in this instance, formed with one of the lugs g of the heel-plate or clip-iron G. This toe is inclined, extending upward and inward from the finger-beam heel, and in its normal position rests against or close to the front of the coupling-arm, with its end or point about in the horizontal plane of or flush with the adjacent upper surface of the coupling-arm.

A rocking dog or lever, Q, is mounted on the coupling-arm, for acting on the toe P, and for elevating the cutting apparatus, and is shown as pivoted on the pin or bolt p, which supports the rocking hook N. This vertically-rocking lever Q plays close to or against the front side of the coupling-arm, and is connected by its inner or longer end with a raising and lowering lever, R, by a chain, S. This lifting-lever R is provided with the usual auxiliaries, such as the segment T, to which the chain is attached, the spring-detent U, and the retainer or rack V, all, in this instance, mounted on the wooden frame-bar C.

The outer or shorter end of the dogging-lever Q overlaps the toe P, and is provided with a short side projection or stop-lug, q, which overhangs and abuts upon the coupling-arm, to limit the downward movement of the outer end of the lever as the opposite end is acted upon by the lifting chain and lever R.

With the parts in their working positions, as shown in Figs. 1, 2, 3, and 4, it will readily be understood that the cutting apparatus is left free to conform as fully as desirable to the undulations of the ground over which the machine may be drawn. When the lifting-lever is operated to actuate the lever which dogs the toe at the heel end of the finger-beam, the finger-beam is first stiffened, and is then raised at its outer end. Should it be desired to raise the cutting apparatus still higher, the movement of the lifting-lever backward is continued to the required extent, raising the coupling-arm and cutting apparatus together, the strain being brought directly upon the coupling-arm by the stop q of the dogging-lever bearing thereon. When the full lifting movement has been imparted to the lever R the finger-beam may be turned up and locked in its elevated position by the hooks N n for transportation. (See Fig. 5.) The full lines in this figure show the positions to which the parts may be lowered by the lever R preparatory to unlocking and turning down the finger-beam.

I am aware that various means have heretofore been employed for stiffening and raising and lowering finger-beams of mowers, and I do not, therefore, broadly claim an organization of devices whereby an attachment to a finger-beam is acted upon by a lever and co-operating mechanism to stiffen, raise, and lower the cutting apparatus.

I claim as of my own invention—

1. The combination of the finger-beam, the rigid hook at the heel of the finger-beam, the coupling-arm, and the rocking spring-actuated hook pivoted to the coupling-arm, these members being and operating substantially as hereinbefore set forth.

2. The combination of the finger-beam, the hook connected with the heel of the finger-beam and having a rounded head, the coupling-arm having the sleeve-bearing or pivot-socket, and the spring-actuated rocking hook limited in its movement by abutting against the pivot-socket of the coupling-arm, substantially as and for the purpose hereinbefore set forth.

3. The combination of the coupling-arm, the finger-beam, the rocking hook for engaging with and supporting the finger-beam in its elevated position, and the spring acting on said hook, substantially as and for the purpose hereinbefore set forth.

4. The combination of the coupling-arm, the rigidly-attached bearings or flanges projecting above and below the coupling-arm, the brace-arm pivoted to one of said bearings, the connecting-rod pivoted to the other of said bearings, the rocking lever, the supporting-bracket, the doubly-jointed connection between the connecting-rod and the lower end of said lever, and the doubly-jointed connection between the supporting-bracket and the brace-arm, these members being and operating as hereinbefore set forth.

In testimony whereof I have hereunto subscribed my name.

GEO. SWEET.

Witnesses:
J. C. WHITEHEAD,
F. T. BRETTLE.